United States Patent [19]

Fleck et al.

[11] 4,034,133

[45] July 5, 1977

[54] MAGNETIC RECORDING MEDIUM WITH LUBRICANT

[75] Inventors: Harry Ronald Fleck, Redwood City; Charles Philip Mignosa, San Jose, both of Calif.

[73] Assignee: International Business Machines Corporation, Armonk, N.Y.

[22] Filed: May 14, 1973

[21] Appl. No.: 360,228

[52] U.S. Cl. .................. 428/64; 428/416; 428/538; 428/539; 428/900
[51] Int. Cl.² .......................... H01F 10/00
[58] Field of Search .............. 117/235–240, 117/169 R; 252/62.54, 25; 428/900, 416, 538, 539, 64

[56] References Cited

UNITED STATES PATENTS

| | | | |
|---|---|---|---|
| 2,446,251 | 8/1948 | Stricklin | 252/25 |
| 3,320,090 | 5/1967 | Graubart | 117/235 |
| 3,387,993 | 6/1968 | Flowers | 117/235 |
| 3,474,073 | 10/1969 | Higashi | 117/235 X |
| 3,523,086 | 8/1970 | Bisschops et al. | 117/235 X |
| 3,542,589 | 11/1970 | Hartmann et al. | 117/235 |

FOREIGN PATENTS OR APPLICATIONS 1,112,657  5/1968  United Kingdom

OTHER PUBLICATIONS

Friedman et al, vol. 9, No. 7, Dec. 1966, IBM Tech. Dis. Bull., p. 779.
Handbook of Chemistry, seventh ed., Lange, 1949 pp. 202 and 262.

Primary Examiner—Bernard D. Pianalto
Attorney, Agent, or Firm—Joseph G. Walsh

[57] ABSTRACT

A magnetic recording element of the type including a base and a coating upon a surface of the base, the coating comprising magnetic particles dispersed in a polymeric binder and a lubricant, the improvement comprising a lubricant chosen from the group consisting of a trifluoride of cerium, lanthanum, praseodymium, neodymium, and samarium.

9 Claims, No Drawings

MAGNETIC RECORDING MEDIUM WITH LUBRICANT

FIELD OF THE INVENTION

Magnetic recording elements in general, and magnetic recording elements in particular having a polymeric base and a lubricant incorporated therein.

BACKGROUND OF THE INVENTION

Magnetic recording elements in the form of tape and disks are well known in the art. Disk elements have been widely accepted in the industry for use in both fixed file units, such as the initial IBM 305 RAMAC of the 1950's, and subsequent disk products such as the IBM 5440 Disk Cartridge, more fully described in U.S. Pat. No. 3,635,608; in the IBM 1316 Disk Pack, more fully described in U.S. Pat. Nos. 3,176,281 and 3,206,214; in the IBM 2315 Disk Cartridge, more fully described in U.S. Pat. Nos. 3,526,884 and 3,304,544; and other well known disk products, such as the IBM 3336 Disk Pack, and the IBM 3840 Data Module. Each of the above is characterized in having at least one magnetic recording element including a base, such as an aluminum substrate and a polymeric coating upon a surface of the base, such as an epoxy phenolic resin, the coating further comprising magnetic particles such as iron oxide dispersed in the binder. Further, the cartridges noted above are contained in a separate housing for insertion with the housing onto a record processing machine. When placed upon the machine, separate transducer means is permitted to enter into the housing to interact with the magnetic recording element.

The disk packs by contrast do not have their own housing, but are mounted upon a spindle for rotation therewith. The pack is removably placed upon the record processing machine. Separate accessing means from the machine are also used for disk accessing. In the data module noted above, however, the heads are contained within the housing, the entire module being removable from the record processing machine. Fixed files are well known in the art, and may have fixed or movable heads as desired.

In each of these systems, rotational speeds of up to 3600 revolutions per minute or more may be attained. The accessing means, generally magnetic transducer means, fly in close relationship to the disk upon an air bearing caused by the rotation of the disk and the aerodynamic design of the head. These heads may fly as close as 30 microinches, or even closer, from the surface of the disk. While every effort is made to assure that disk surface topography is as flat and perfect a surface as possible, the possibility exists that the head may be caused to come into contact with the disk due to a local asperity in the surface of the disk, or from dirt entering between the head and disk. This "crashing" can cause a loss of data, and serious damage to the head and the disk. Further, systems have been envisioned in which the head will start by sitting upon the disk, and will not begin to fly until a minimum rotational speed is achieved. Similarly, stopping will allow the head to slowly glide to a halt upon the disk surface.

In the above circumstances, damage to the disk must be minimized to maintain the data stored in the disk coating. Thus, many different lubricant systems have been proposed, including various silicones for example, and lubricating oils incorporated within the recording coating itself, or as additives upon the surface. Some have proven successful to a limited degree.

Thus, an object of this invention is a lubricant of high wear characteristics that may be used with magnetic recording elements in tape or disk form.

A further object is a lubricant that does not adversely affect the adhesion of the magnetic recording medium to the underlying base or substrate, nor will affect the magnetic properties thereof.

A further object is a lubricant having long life and that is inexpensive and readily incorporated into the coating or upon the coating as desired.

SUMMARY OF THE INVENTION

A magnetic recording element of the type including a base and a coating upon a surface of the base, the coating comprising magnetic particles dispersed in a polymeric binder and a lubricant, the improvement comprising a lubricant chosen from the group consisting of a trifluoride of cerium (Ce), lanthanum (La), praseodymium (Pr), neodymium (Nd), and samarium (Sm). Preferably the polymeric binder is an epoxy phenolic resin system, the magnetic particles are iron oxide, and the lubricant is cerous trifluoride.

The above objects and other objects will become evident from the following general description and claims, which in combination will clearly define this invention.

GENERAL DESCRIPTION

Magnetic recording compositions are well known in the prior art and are typified for example in U.S. Pat. No. 3,058,844, to Johnson, et al, and assigned to the assignee of this invention. Basically, that coating is an epoxy phenolic resin base coating particularly designed for use with aluminum substrates, and containing magnetic particles, such as iron oxide. Many different compositions are well known in the art including the above mentioned epoxy phenolic, epoxies, epoxy melamines, and other types of resin base systems. As magnetic particles, these include not only iron oxide, but often chrome dioxide or other magnetic materials for use for magnetic recording purposes such as the data processing disk cartridges, modules, and disk packs listed in the aforementioned background.

These magnetic recording coatings also often contain hard particles having hardness greater than that of the binder to add to the strength of the coating. It has been discovered that when the particles are of a hardness greater than that of the coating and of a size substantially equal to the thickness of the coating, significantly improved results have been obtained in the life of the coating on a wear basis. We have further found that adding a lubricant to this combination, or indeed to the general magnetic recording coating composition noted above, adds appreciably also to the life of the coating. Results show that a lubricant is necessary to minimize wear in head-disk interaction situations. We have most particularly found that $CeF_3$, $LaF_3$, $PrF_3$, $NdF_3$, and $SmF_3$ are most useful as lubricants either dispersed within the polymeric binder itself, or as a layer upon the finished surface of the magnetic recording coating. The table shows some of the properties of these materials, particularly the lattice constants and ionic radius, showing the similarity of the five materials.

TABLE I

|  | a | c | z | $b_r$ | M (ionic radius) |
|---|---|---|---|---|---|
| $CeF_3$ | 7.112 | 7.297 | 6 | 6.157 | 1.11 (+3) |
| $LaF_3$ | 7.184 | 7.351 | 6 | 5.939 | 1.15 (+3) |
| $PrF_3$ | 7.075 | 7.238 | 6 | 6.14 | .09 (+3) |
| $NdF_3$ | 7.030 | 7.199 | 6 | 6.506 | 1.08 (+3) |
| $SmF_3$ | — | — | — | — | 1.04 (+3) |

These materials are all hexagonal in structure. These materials, either singly or in combination, may be directly added to the polymeric material such as the epoxy phenolic by addition during the mixing operation. Materials such as the epoxy resin, phenolic resin, solvents, mixing agents, iron oxide, and any added non-magnetic particles, are mixed in a ball mill, pearl mill, or sand mill, for example, to achieve a homogeneous dispersion of all materials. The lubricant can be added at this time if it is desired to disperse the lubricant within the polymeric binder. The methods of mixing these and similar coating compositions are well known in the art, and the lubricant may be effectively added at any time during the process.

Generally, less than 1½% lubricant based on the total solids weight of the cured coating is insufficient to noticeably affect the lubricity, while greater than 50% by weight may affect subsequent coating adhesion or magnetic properties. Tests have shown that when using the epoxy-melamine system, lubricant quantities greater than 50% do not affect adhesion. In a preferred embodiment, 16% by weight of $CeF_3$ was used, of a size less than 0.5 microns, in a 50 μ inch thick coating having a magnetic particle loading of $\gamma$-$Fe_2O_3$ of about 50% by weight.

In place of the epoxy phenolic resin combination above, epoxy-melamine is equally preferred. Similarly, $CeF_3$-$LaF_3$ lubricant as a combined particle may also be used. After ball milling for example, the coating viscosity may be adjusted with suitable solvents for coating upon the magnetic recording element substrate. For aluminum substrates for example, the viscosity is adjusted for spin coating conditions and may be coated in accordance with the process outlined in U.S. Pat. No. 3,198,657, Kimball, et al, and assigned to the assignee of this invention. After coating, the magnetic coating is cured, buffed and burnished as is well known in the prior art.

Tests were performed upon the disks made by the coating formulations given above, with a range of lubricant amounts. Disks were also made where the only difference in coating composition was the presence or absence of the lubricant. A start/stop cycle incorporates a disk having a 50 μ inch coating started with a 10 gram ceramic recording head sitting upon the disk while the disk was rotated until flying speed for the head was achieved, and then letting the disk slow down until the head made contact with the disk again. Keeping the head upon a given track position, severe physical and magnetic damage was noted after less than 150 start/stop cycles without the presence of a lubricant. The damage was visible to the naked eye. With the lubricant present in the coating, over 20,000 start/stop cycles were achieved with no physical damage noted to the track, or to the head.

Thus, we have made a recording element of the type including a base and a coating upon a surface of the base, the coating comprising magnetic particles disposed in a polymeric binder and a lubricant, where our improvement comprises the lubricant chosen from the group consisting of a trifluoride of Ce, La, Pr, Nd, and Sm. The lubricant is preferably dispersed in the polymeric binder of the recording coating, but may also be dispersed upon the surface of the recording coating. To do this, it may be initially contained as fine particles in a solution, and then deposited upon the surface of the recording element by known auto electrophoretic deposition techniques. Other liquid carriers may be utilized to deposit the material upon the surface, whether in colloidal or non-colloidal form. For example, $CeF_3$ may be carried in an aqueous solution having a pH of 2–3 adjusted with glacial acetic acid, for deposition upon an epoxy-phenolic base.

A lubricant amount of up to 50% by weight based on total weight of coating is preferred. More generally, epoxy phenolic is the preferred resin system in conjunction with iron oxide magnetic particles, with $CeF_3$ in an amount of 16% by weight. Epoxy melamine is a next preferred system. At least 1½% lubricant by weight should be used. Disk and tape configurations are well known recording forms for which this coating is useful. Further, hard particles may also be incorporated into the coating composition, where the particles have a hardness greater than that of the binder and are substantially equal to the thickness of the coating.

These magnetic recording elements may be utilized in various configurations such as for fixed files, data modules, disk packs, and disk cartridges, all of which are noted above as well known within the prior art.

$CeF_3$ is the preferred material, $LaF_3$ is the next preferred material and combinations of these materials may also be utilized as desired.

What is claimed is:

1. In a magnetic recording element of the type including a base and a coating upon a surface of the base, the coating comprising magnetic particles dispersed in a polymeric binder and a lubricant, the improvement comprising a lubricant chosen from the group consisting of a trifluoride of Ce, La, Pr, Nd, and Sm, said lubricant being present in from 1½% to 50% by weight of the coating.

2. The magnetic recording element of claim 1 wherein the lubricant is dispersed in the polymeric binder of the recording coating.

3. The magnetic recording element of claim 1 wherein the lubricant is dispersed upon the surface of the recording coating.

4. The magnetic recording element of claim 1 wherein the element is of tape configuration.

5. The magnetic recording element of claim 1 wherein the polymeric binder is an epoxy-phenolic resin system.

6. The magnetic recording element of claim 1 wherein the polymeric binder is an epoxy-melamine resin system.

7. The magnetic recording element of claim 1 wherein the magnetic particles are iron oxide.

8. The magnetic recording element of claim 1 wherein the lubricant is $CeF_3$ in an amount of substantially 16% by weight of the coating.

9. The magnetic recording element of claim 1 wherein the element is of disk configuration.

* * * * *